United States Patent

Haase et al.

[15] 3,701,088
[45] Oct. 24, 1972

[54] DEMAND SONOBUOY
[72] Inventors: Richard J. Haase; William L. Roever, both of Houston, Tex.
[73] Assignee: Shell Oil Company, New York, N.Y.
[22] Filed: June 18, 1970
[21] Appl. No.: 47,468

[52] U.S. Cl. .................................340/2, 340/7 R
[51] Int. Cl. ...............................................G01s 9/66
[58] Field of Search......340/2, 3 R, 7 R, 16 C; 181/.5

[56] References Cited

UNITED STATES PATENTS 3,062,315  11/1962  Herzog..........................181/.5
2,395,679  2/1946  Neuhof..........................340/2
3,564,491  2/1971  Granfors et al............340/2 X

OTHER PUBLICATIONS

Walden et al., Electronics, Vol. 30, No. 6, June 1, 1957, pp. 164–167.

Primary Examiner—Richard A. Farley
Attorney—H. L. Denkler and T. E. Bieber

[57] ABSTRACT

A demand sonobuoy having both sending and receiving radio equipment therein. The transmission of seismic data detected by a hydrophone connected to the demand sonobuoy is controlled by radio signal from a remote point.

2 Claims, 2 Drawing Figures

INVENTORS:
R. J. HAASE
W. L. ROEVER

DEMAND SONOBUOY

BACKGROUND OF THE INVENTION

This invention is generally concerned with marine seismic exploration. More particularly it is directed to sonobuoys that transmit data only on command from a remote point.

The use of sonobuoy in marine seismic exploration is well known. However, with known sonobuoys either the seismic data are recorded at the sonobuoy and collected by boat or the data are continuously transmitted from the sonobuoy to a remote recording station by a radio transmitter located on the sonobuoy.

The disadvantage of having to collect the data from each sonobuoy is cost. Chartering marine exploration boats and crews is very expensive, and the collection of data from each sonobuoy individually is very time-consuming since the sonobuoys may be up to 20 miles apart. Continuously transmitting sonobuoys avoid the data collection problem, but they in turn have disadvantages. To start with, they are battery operated and therefore have a limited lifetime. It is almost as expensive to go from sonobuoy to sonobuoy recharging batteries as it is to do the same thing for collecting recorded data. Next, continuously transmitting sonobuoys clog the radio frequency spectrum. To be reliable, a radio transmitting sonobuoy must have a clear frequency channel in which to operate. Otherwise the relatively low power sonobuoy transmissions would be lost in interference. However, the demands for frequency channels by other users is great and growing rapidly. Thus, there is an urgent need to converse the radio frequency spectrum by making the most efficient use thereof. Finally, it is often necessary to visit a continuously transmitting sonobuoy to make adjustments in the electronics therein. For example, transmitter power would desirably be increased as the recording station — a combination shooting and recording boat — is moved away from the sonobuoy. Also it may be desirable to change the filters and/or amplifiers connected to the hydrophone. These things cannot be done with continuously transmitting sonobuoys.

Thus, it is an object of this invention to make the most efficient use of frequency channels allocated to sonobuoy use.

It is another object of this invention to greatly reduce the frequency with which sonobuoy batteries must be recharged.

Finally, it is an object of this invention to provide a radio transmitting sonobuoy that does not overload the receiving equipment at the recording station.

SUMMARY OF THE INVENTION

These and other objects of the invention may be achieved by a demand sonobuoy. A sonobuoy having a hydrophone operatively connected thereto is further provided with an amplifier means located in the sonobuoy for amplifying the electrical signals generated by the hydrophone in response to seismic disturbances received by the hydrophone. A radio transmission means is also located in the sonobuoy and is connected to the amplifier means for transmitting the amplified electrical signal to remote points. Finally, a radio receiver means is located in the sonobuoy where it operatively engages the radio transmission means such that the timing and duration of sonobuoy radio transmissions are controlled by the output signal of the radio receiver means.

According to a further aspect of the invention, the demand sonobuoy transmitter power may be varied by signals transmitted from a remote point and received by the demand sonobuoy radio receiver. Likewise, other portions of the demand sonobuoy electronics may be adjusted in this manner.

The demand sonobuoy may be used in the following method of marine seismic exploration. First, a sonobuoy is anchored in a predetermined location and the connected hydrophone is positioned. The sonobuoy radio is maintained in a receiving condition. Next, an actuation signal of a selected frequency and duration is transmitted from a remote point thereby switching the sonobuoy radio into a transmitting mode for a selected limited time whereafter the sonobuoy radio automatically reverts to the receiving mode. Next, a seismic disturbance is generated at some point spaced from the sonobuoy and is coordinated with the actuation signal such that any seismic signals received by the hydrophone are received while the sonobuoy radio is in the transmitting mode. The sonobuoy radio then transmits the received seismic data to a remote recording station where it is received and recorded.

DESCRIPTION OF THE PREFERRED EMBODIMENT

Figure 1:
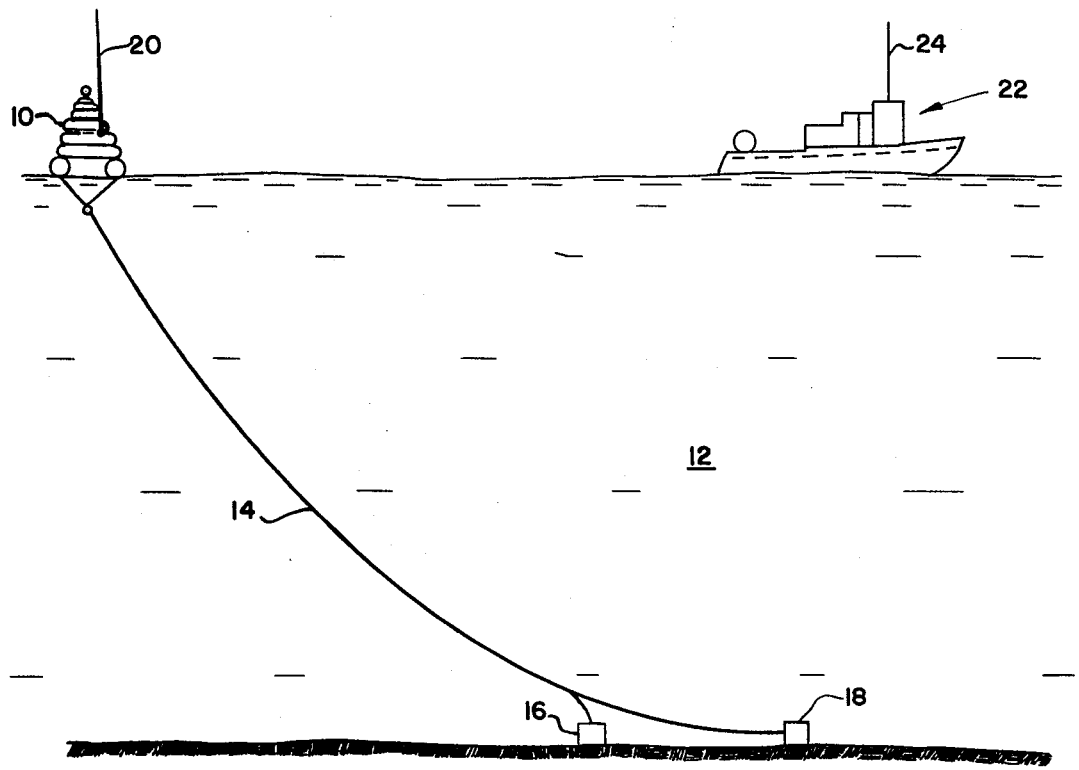
FIG. 1 is a diagram showing the general setting of a demand sonobuoy.

Referring to FIG. 1 there is shown a demand sonobuoy 10 floating on the surface of a body of water 12. Connected to the bottom of sonobuoy 10 is a combination anchor and hydrophone cable 14. Weight 16 is connected to cable 14 and maintains sonobuoy 10 in position. A hydrophone 18 positioned near the floor of the body of water is electrically connected through cable 14 to sonobuoy 10. Attached to the top of sonobuoy 10 and extending upwardly is an antenna 20.

A combination shooting and recording boat 22 is located at some distance from sonobuoy 10. Boat 22 is equipped with radio equipment illustrated by antenna 24 and is provided with equipment for generating seismic disturbances in the water.

After leaving port and arriving in the area to be seismically surveyed, boat 22 may position one or more demand sonobuoys 10 in a predetermined location. The radio circuitry in the demand sonobuoy is normally in the receiving mode and thereby consumes only a small fraction of the power needed to transmit so that sonobuoy batter power is conserved. When boat 22 is in position, a signal of predetermined frequency and duration is transmitted via the boat transmitter to demand sonobuoy 10 which is picked up by the sonobuoy receiver and converted to an electrical signal causing the sonobuoy radio circuitry to switch in to the transmission mode for a specified time. At a time coordinated with the signal sent to the sonobuoy, seismic disturbances are generated at or near boat 22 by conventional means. Some of the seismic energy generated will pass down through the water into the earth to be refracted and/or reflected by discontinuities therein. The remainder of the seismic energy is dissipated in the water and is called the water break energy.

Hydrophone 18 detects and converts the refracted seismic energy as well as the water break energy to proportional electrical signals. The refracted waves will be in the 1 to 30 Hz frequency range. The water break energy will be in the 200 to 2,000 Hz frequency range. Thus, the two may be easily distinguished by filtering. After reducing the amplitude of the water break signal to about the amplitude of the refraction signal, both are transmitted via the demand sonobuoy radio transmitter to boat 22. There the signals are recorded. At the end of the transmission period, the demand sonobuoy circuitry reverts back to the receive mode and is ready to repeat the cycle.

Figure 2:
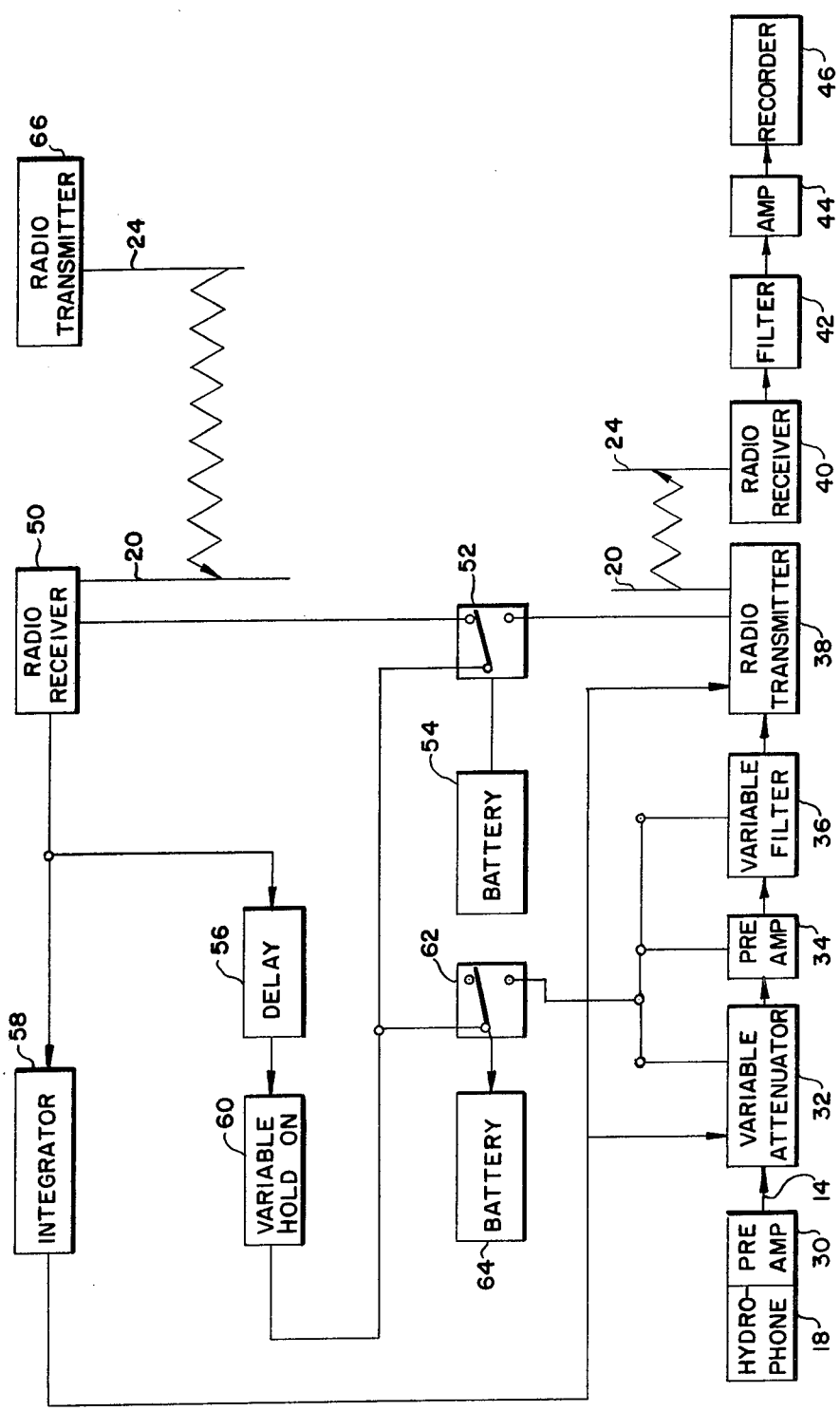
FIG. 2 is a block diagram of the electronics of the demand sonobuoy.

FIG. 2 is a block diagram of one embodiment of the demand sonobuoy circuitry. All of the blocks represent components that are conventional in every sense and well known in the art. Consequently it is believed unnecessary to go further into their description than to describe their function and interrelationship.

Referring now to FIG. 2, reference numeral 18 again as in FIG. 1 marks a hydrophone. A conventional pre-amplifier 30 is contiguous to the hydrophone transducer and boosts the very small hydrophone signals before they are sent over cable 14 to demand sonobuoy 10. Cable 14 is connected in the sonobuoy to variable attenuator 32. The function of this device is that of noise suppression in one setting and in another setting that of signal attenuator to avoid overloading the receiver in boat 22 and the sonobuoy amplifiers when the boat is close to the buoy.

The output of variable attenuator 32 is connected to a variable pre-amplifier 34 which may be varied to maintain the hydrophone signal above some nominal level. The output of variable pre-amplifier is connected to a variable filter bank 36 that is used in connection with processing the seismic data. Typically, such filters may be set as low pass, high pass, or band pass around such frequencies as 10, 20, 40, 60, and 100 Hz. The output of filter 36 is connected to radio transmitter 38 where the filtered and amplified hydrophone signal modulates a ratio frequency signal that is then transmitted via antenna 20. Either amplitude modulation (a.m.) or frequency modulation (f.m.) is preferred due to its restricted range and relatively noise free signal.

Aboard boat 22, the radio signal transmitted from demand sonobuoy 10 is received by antenna 24 and radio receiver 40. Radio receiver 40 modulates the hydrophone signal and passes the demodulated signal on to filter 42 and amplifier 44 where further seismic data processing may take place before the signal is recorded on recorder 46.

Also located in sonobuoy 10 is a radio receiver 50 that is like transmitter 38 connected to antenna 20. Radio receiver 50 is connected through relay 52 to battery 54. When relay 52 is in the position shown, power is supplied form battery 54 to radio receiver 50. The sonobuoy radio circuitry is in the receive mode. When relay 52 is in its other position, power is supplied from battery 54 to radio transmitter 38. Under this condition, the sonobuoy radio circuitry is in the transmission mode.

The output of radio receiver 50 is supplied to a delay circuit 56 and an integrator circuit 58. The output of integrator circuit 58 is connected to variable attenuator 32 and radio transmitter 38. When the output of integrator circuit 58 reaches a certain predetermined level, attenuator 32 is actuated causing the hydrophone signal to be attenuated by some predetermined quantity such as 20 db. Likewise, the power output of radio transmitter 38 is reduced to some low level such as 1 watt. (Normal transmitting power is in the range of fifteen watts.) As mentioned earlier this arrangement prevents overloading of the sonobuoy amplifiers and boat radio receiver when the sonobuoy and boat are nearby.

After being delayed for approximately 10 seconds by delay circuit 56 to allow the integrator 58 to operate if it is required to do so, the output signal of radio receiver 50 is supplied to the input of variable hold-on circuit 60. Variable hold-on circuit 60 is essentially a timer that supplies an output voltage for a certain predetermined time. Typically the time may be adjusted by hand between such valves as one-half minute, 1 minute, or 3 minutes, and setting is made before the buoy is positioned in the water. The output of variable hold-on circuit 60 actuates relay 52 and 62 causing relay 62 to switch from the position shown to the alternative position where battery 64 is connected to and actuates variable attenuator 32, preamplifier 34 and variable filter 36. Likewise, relay 52 is switched from the position shown to the alternative position so that battery 54 is disconnected from radio receiver 50 and is connected to and actuates radio transmitter 38. Radio transmitter 38 then transmits the filtered and amplified hydrophone signal until variable hold-on circuit 60 turns off and deactivates relays 52 and 62. The circuitry then reverts to its original receiving mode condition with battery 54 connected to radio receiver 50.

Aboard boat 22 (frequently called an instrument boat) along with the radio receiver and recording equipment is a radio transmitter 66. Transmitter 66 and receiver 50 are tuned to the same frequency as are transmitter 38 and receiver 40. The demand sonobuoy is switched from its normal receiving mode to the transmitting mode by sending a radio signal of from 1 to 2 seconds duration from transmitter 66 to receiver 60. This signal actuates relays 52 and 62 as previously described but does not actuate integrator 58. However, if a signal of 3 seconds or longer duration is transmitted, not only are relays 52 and 62 actuated, but also integrator 58 supplies an output signal of sufficient amplitude to switch variable attenuator 32 and radio transmitter 38 into their strong signal condition as described previously.

Finally, the method and apparatus of the invention may be used equally well with either the reflection or refraction method of seismic exploration.

We claim as our invention:

1. A demand sonobuoy system for use in seismic exploration, comprising:
   a sonobuoy having a hydrophone operatively connected thereto;
   amplifier means located in said sonobuoy and connected to said hydrophone for amplifying electrical signals generated by said hydrophone in response to seismic disturbances received by said hydrophone;

radio transmission means located in said sonobuoy and connected to said amplifier means for transmitting said amplified electrical signal to remote points;

radio receiver means located in said sonobuoy and operatively engaging said radio transmission means such that the timing and duration of transmissions from said radio transmissions means are controlled by the output signal of said radio receiver means;

an integrator circuit connected between said radio receiver output and said radio transmission means and responsive to said radio receiver to supply a signal of predetermined amplitude to said radio transmission means when said radio receiver supplies an output signal greater in duration than some predetermined value; and attenuator means in said radio transmission means responsive to an output signal of predetermined amplitude of said integrator circuit to reduce the power output of said radio transmission means.

2. The demand sonobuoy system of claim 1 wherein said radio receiver means includes:

a timing circuit connected to the output of said radio receiver and adapted to supply a timed output signal in response to the output signal of said radio receiver;

a power supply; and switching means connected between said power supply and radio receiver, said radio transmission means and the output of said timing circuit such that said switching means connects said power supply to said radio transmission means for the duration of said timed output pulse and otherwise connects said power supply to said radio receiver.

* * * * *